(12) United States Patent
Kato

(10) Patent No.: US 11,054,287 B2
(45) Date of Patent: Jul. 6, 2021

(54) SIGNAL PROCESSING METHOD FOR PHOTOELECTRIC ENCODER

(71) Applicant: MITUTOYO CORPORATION, Kanagawa (JP)

(72) Inventor: Yoshiaki Kato, Urayasu (JP)

(73) Assignee: MITUTOYO CORPORATION, Kawasaki (JP)

( * ) Notice: Subject to any disclaimer, the term of this patent is extended or adjusted under 35 U.S.C. 154(b) by 127 days.

(21) Appl. No.: 16/454,437

(22) Filed: Jun. 27, 2019

(65) Prior Publication Data

US 2020/0011711 A1 Jan. 9, 2020

(30) Foreign Application Priority Data

Jul. 3, 2018 (JP) ............................. JP2018-126818

(51) Int. Cl.
*G01D 5/347* (2006.01)
(52) U.S. Cl.
CPC ................................ *G01D 5/34715* (2013.01)
(58) Field of Classification Search
CPC ........... G01D 5/34715; G01D 5/34707; G01D 5/347; G01D 5/34746; G01D 5/34776; G01D 5/34784; G01D 5/34792; G01D 5/3473
See application file for complete search history.

(56) References Cited

U.S. PATENT DOCUMENTS

| 6,987,465 | B2 * | 1/2006 | Mittmann | G01D 5/24476 |
| | | | | 341/15 |
| 10,119,844 | B2 | 11/2018 | Hirata | |
| 2004/0133844 | A1 * | 7/2004 | Mittmann | G01D 5/34776 |
| | | | | 714/808 |
| 2007/0051884 | A1 * | 3/2007 | Romanov | G01P 3/36 |
| | | | | 250/231.13 |
| 2011/0173832 | A1 * | 7/2011 | Gribble | G01D 5/24461 |
| | | | | 33/701 |
| 2016/0245673 | A1 * | 8/2016 | McAdam | G01D 5/366 |
| 2017/0074687 | A1 * | 3/2017 | Hirata | G01D 5/34776 |
| 2020/0011711 | A1 * | 1/2020 | Kato | G01D 5/34715 |
| 2020/0149931 | A1 * | 5/2020 | Prystupa | G01D 5/34 |

FOREIGN PATENT DOCUMENTS

JP 2017-058138 A 3/2017

* cited by examiner

*Primary Examiner* — John R Lee
(74) *Attorney, Agent, or Firm* — Rankin, Hill & Clark LLP

(57) ABSTRACT

There is provided a signal processing method, for a photoelectric encoder, capable of correctly determining a bright part and a dark part of a bright/dark pattern having distorted light intensity distribution by setting an appropriate threshold. A detector unit includes a light source, a light-receiving detector that receives transmitted light from a scale to acquire a bright/dark image, and a lens arranged between the light source and the light-receiving detector. The detector unit classifies the bright/dark image acquired by the light-receiving detector into an image-forming region corresponding to a center region of the lens and a non-image-forming region corresponding to a region except for the center region of the lens, calculates a representative value reflecting a light intensity of the image-forming region, and obtains a preprocessed bright/dark image in which the light intensity of the non-image-forming region is replaced with the representative value.

5 Claims, 22 Drawing Sheets

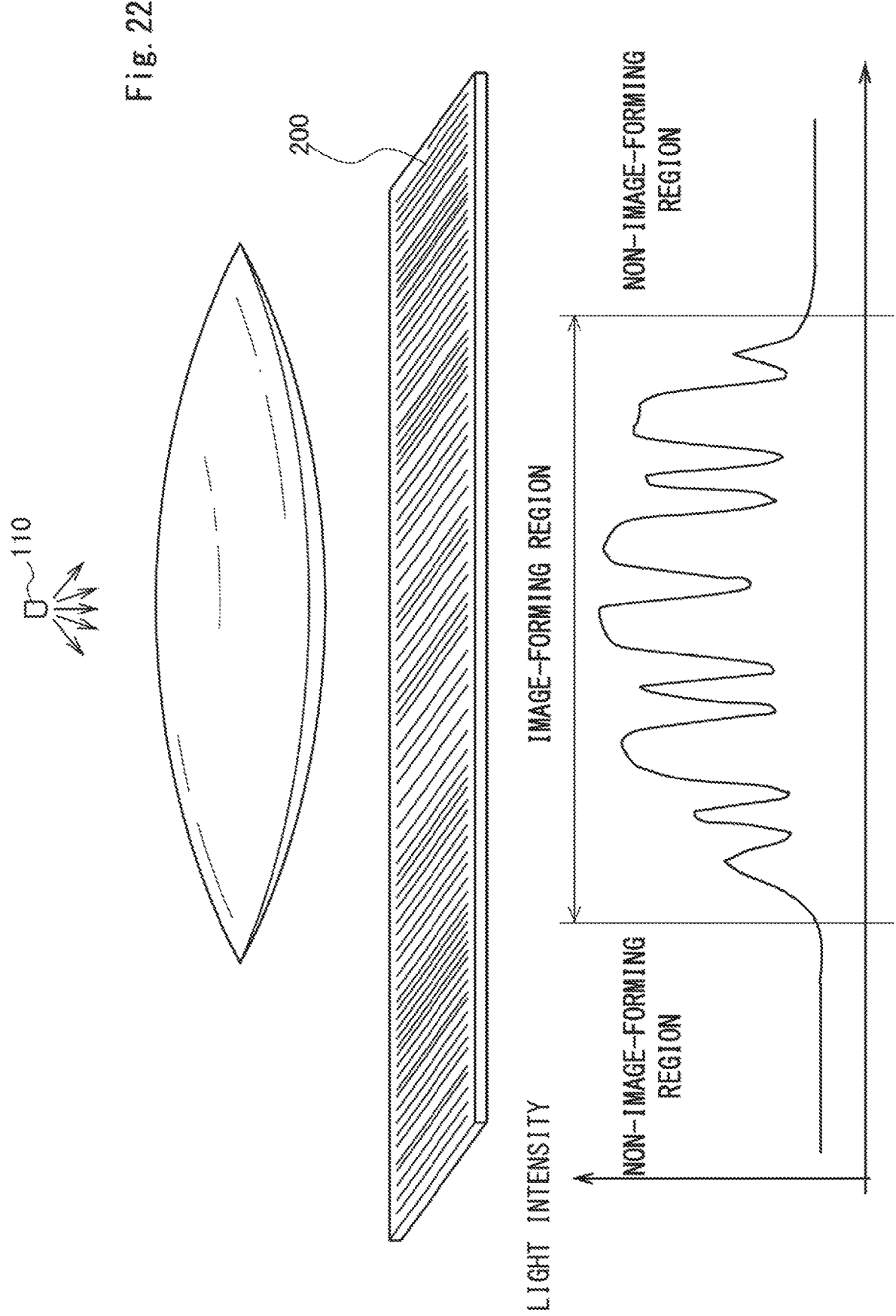

SIGNAL PROCESSING METHOD FOR PHOTOELECTRIC ENCODER

INCORPORATION BY REFERENCE

This application is based upon and claims the benefit of priority from Japanese patent application No. 2018-126818, filed on Jul. 3, 2018, the disclosure of which is incorporated herein in its entirety by reference.

BACKGROUND OF THE INVENTION

1. Field of the Invention

The present invention relates to a signal processing method for a photoelectric encoder.

2. Description of Related Art

Photoelectric encoders are widely used as an apparatus for measuring a position or displacement, as is disclosed in JP 2017-58138A, for example.

FIG. 1 shows a main configuration of a photoelectric encoder 100.

The photoelectric encoder 100 includes a light source 110, a main scale 200, a light-receiving detector 300, and a signal processing unit 400. The main scale 200 has a scale pattern 210. The light-receiving detector 300 receives reflected light or transmitted light from the main scale 200. The signal processing unit 400 calculates a position or displacement from a bright/dark pattern received by the light-receiving detector 300.

The light source 110 irradiates the main scale 200 with light through a micro lens array 115 (hereinafter, also referred to as a lens array 115).

The light source 110, the lens array 115, and the light-receiving detector 300 are unitized as a detection head. The detection head is provided so as to be displaceable relatively to the main scale 200.

The lens array 115 has a wider detection region and a shorter focal distance than those of a single lens. Thus, the detection head can be miniaturized with the lens array. Note that, the diameter of a lens constituting the lens array is about several millimeters.

In the scale pattern 210 of a transmission-type photoelectric encoder, a transmitting pan and a non-transmitting part are alternately arranged at a predetermined or random pitch. Alternatively, in the scale pattern 210 of a reflection-type photoelectric encoder, a reflecting part and a non-reflecting part are alternately arranged at a predetermined or random pitch. Note that, the width of a transmitting part (or a non-transmitting part) is about tens of micrometers.

For example, as shown in FIG. 1, it is assumed that the scale pattern 210 in which a transmitting part and a non-transmitting pan are alternately arranged at a random pitch is irradiated with light to form a bright/dark pattern by the transmitted light, and that the light-receiving detector 300 acquires the bright/dark pattern as an image.

The bright/dark pattern image acquired by the light-receiving detector 300 is referred to as a "bright/dark image". In ideal light intensity distribution of the bright/dark image, all light intensities corresponding to the transmitting parts should be the same maximum light intensity, and all light intensities corresponding to the non-transmitting parts should be the same minimum light intensity as exemplified in FIG. 2. If a bright/dark image has such ideal light intensity distribution, a bright part and a dark part can be correctly determined with one fixedly-set threshold.

SUMMARY OF THE INVENTION

However, the actual light intensity distribution of a bright/dark image is distorted as exemplified in FIG. 3 due to various factors, such as the light quantity distribution of the light source 110, distortion of a lens, or a boundary part between lenses of the micro the lens array 115. If a fixedly set threshold is applied to such a distorted bright/dark image, the bright part and the dark part cannot be correctly determined. Thus, a threshold can be calculated with filtering processing for removing long-period distortion using the Fourier transform.

The dashed line in FIG. 3 is an example of an ideal threshold line calculated with the Fourier transform.

However, only with the simple filtering using the Fourier transform, bright/dark determination cannot be correctly performed when the light intensity distribution has large deviation.

When a lens array is used, an image cannot be obtained at a boundary part between lenses. Thus, a region in which dark parts are necessarily arranged at a fixed pitch appears in the bright/dark image. Here, in a bright/dark image, a region of a dark part generated by not forming an image at a boundary part between lenses is referred to as a "non-image-forming region". In contrast, in the bright/dark image, a region in which an image of the scale pattern 210 is obtained by forming the image with a lens is referred to as an "image-forming region".

When the Fourier transform is performed to the bright/dark image in which non-image-forming regions are arranged at a fixed pitch, a wave having a large amplitude appears as exemplified in FIG. 4. (For example, if the bright/dark image is approximated by a single sine wave, the sine wave is strongly pushed down at a dark part of a non-image-forming region, and jumps up at a bright part of a image-forming region by reaction.) Then, in the circled part in FIG. 4, the bright parts cannot be correctly detected.

By the way, that a region between lenses of the lens array 115 is to be a non-image-forming region is known in advance. It might be thought that after the non-image-forming regions are removed from the bright/dark image in advance, you can perform the Fourier transform only to the image-forming regions.

However, $2^n$ pieces of (for example, 256 pieces of) data is required to perform the Fourier transform at high speed. Thus, it is not the best way to simply perform the Fourier transform after the non-image-forming regions are removed from the bright/dark image in advance.

For this reason, there has been desired a photoelectric encoder capable of improving the reliability of bright/dark analysis and increasing the speed of measurement.

A purpose of the present invention is to provide a signal processing method, for a photoelectric encoder, capable of correctly determining a bright part and a dark part in a bright/dark pattern having distorted light intensity distribution by setting an appropriate threshold.

A signal processing method for a photoelectric encoder according to an embodiment of the present invention is a signal processing method for a photoelectric encoder,
the photoelectric encoder including:
a scale provided with a two-level code pattern along a length measurement direction; and a detector unit that is provided to be relatively movable along the scale and detects, based on the two-level code pattern on the scale, a relative position with respect to the scale, and the detector unit including:

a light source;

a light-receiving detector that receives reflected light or transmitted light from the scale and acquires a bright/dark image; and a lens arranged between the light source and the light-receiving detector, the method including:

classifying, by the detector unit, the bright/dark image acquired by the light-receiving detector into an image-forming region corresponding to a center region of the lens and a non-image-forming region corresponding to a region except for the center region of the lens;

calculating, by the detector unit, a representative value reflecting a light intensity of the image-forming region; and obtaining a pre-processed bright/dark image in which a light intensity of the non-image-forming region is replaced with the representative value.

In an embodiment of the present invention, the method preferably further includes:

performing the Fourier transform to the pre-processed bright/dark image;

obtaining a threshold line formed of long-period components lower than a predetermined frequency; and performing, based on the bright/dark image and the threshold line, bright/dark determination of the bright/dark image.

In an embodiment of the present invention, the lens is preferably a micro lens array, and the method preferably further includes:

after the classifying the bright/dark image into the image-forming region and the non-image-forming region;

distinguishing the image-forming region as a 0th image-forming region, a first image-forming region, a second image-forming region, and so on;

distinguishing the non-image-forming region as a 0th non-image-forming region, a first non-image-forming region, a second non-image-forming region, and so on;

calculating the representative value Ik from a k-th image-forming region and a (k+1)th image-forming region that are positioned on both sides of a k-th non-image-forming region; and replacing a light intensity of the k-th non-image-forming region with the representative value Ik, where, k is zero or a natural number.

In an embodiment of the present invention, the method preferably further includes:

dividing in half and classifying the k-th image-forming region into a k-th L image-forming region and a k-th R image-forming region;

calculating the representative value Ik(RL) from the k-th R image-forming region and a (k+1)th L image-forming region that are positioned on both sides of the k-th non-image-forming region; and replacing the light intensity of the k-th non-image-forming region with the representative value Ik(RL).

In an embodiment of the present invention, the representative value is a mean or a median.

BRIEF DESCRIPTION OF THE DRAWINGS

FIG. 22 is a diagram showing an example of an image-forming region and a non-image-forming region when a photoelectric encoder is a single lens.

DETAILED DESCRIPTION

Figure 1:
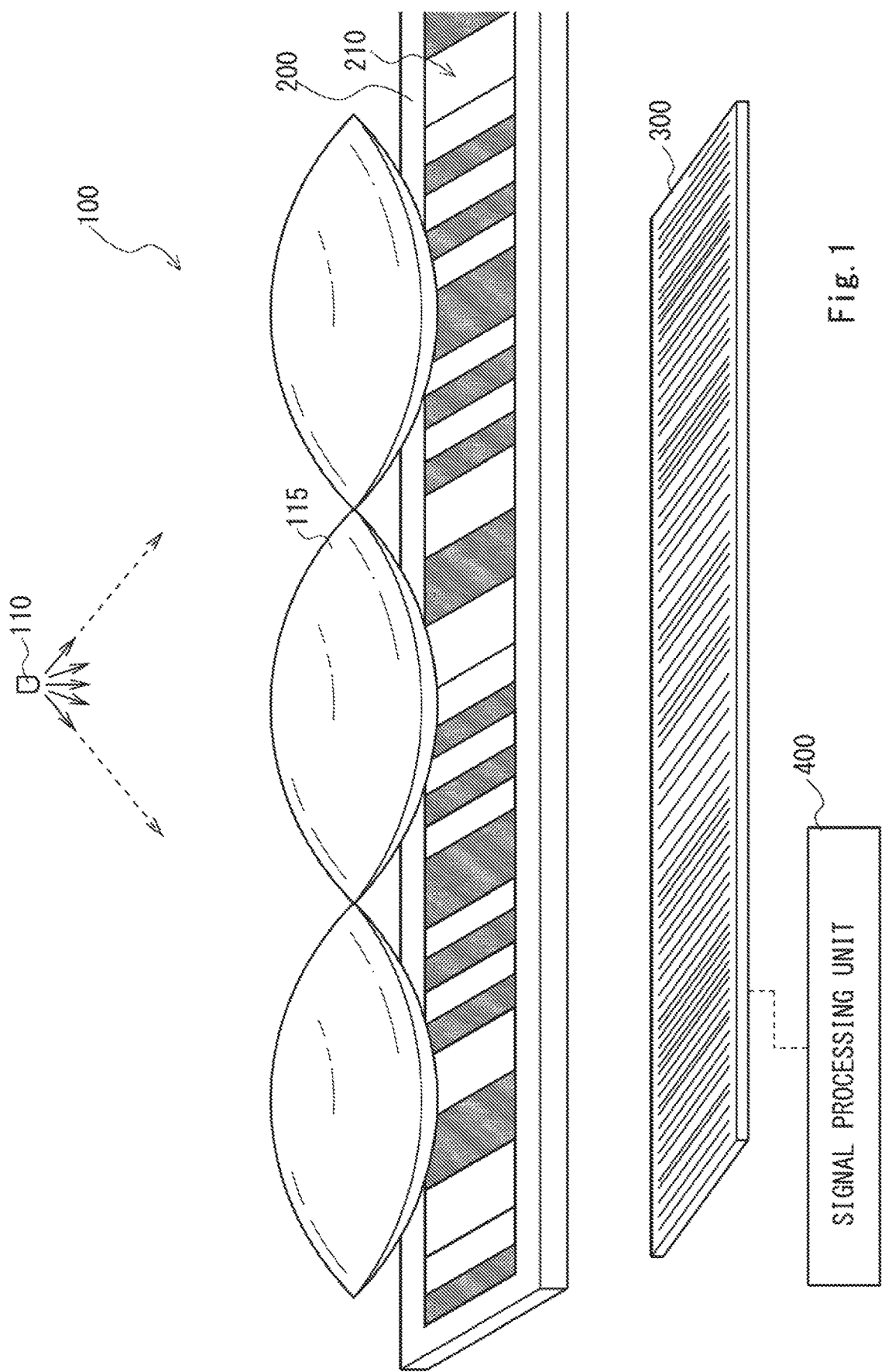
FIG. 1 is a diagram showing a main configuration of a photoelectric encoder.
Figure 2:
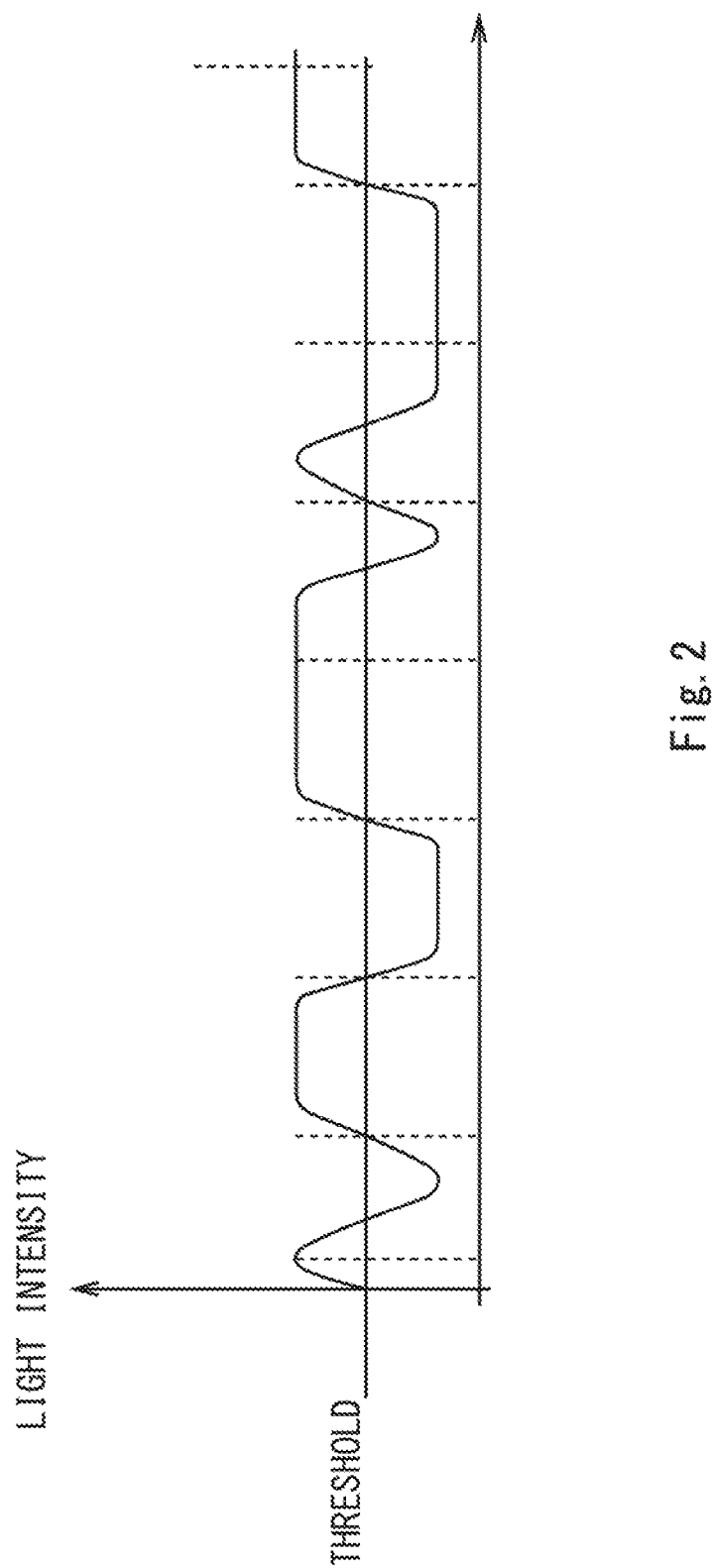
FIG. 2 is a diagram showing an example of an ideal bright/dark image.
Figure 3:
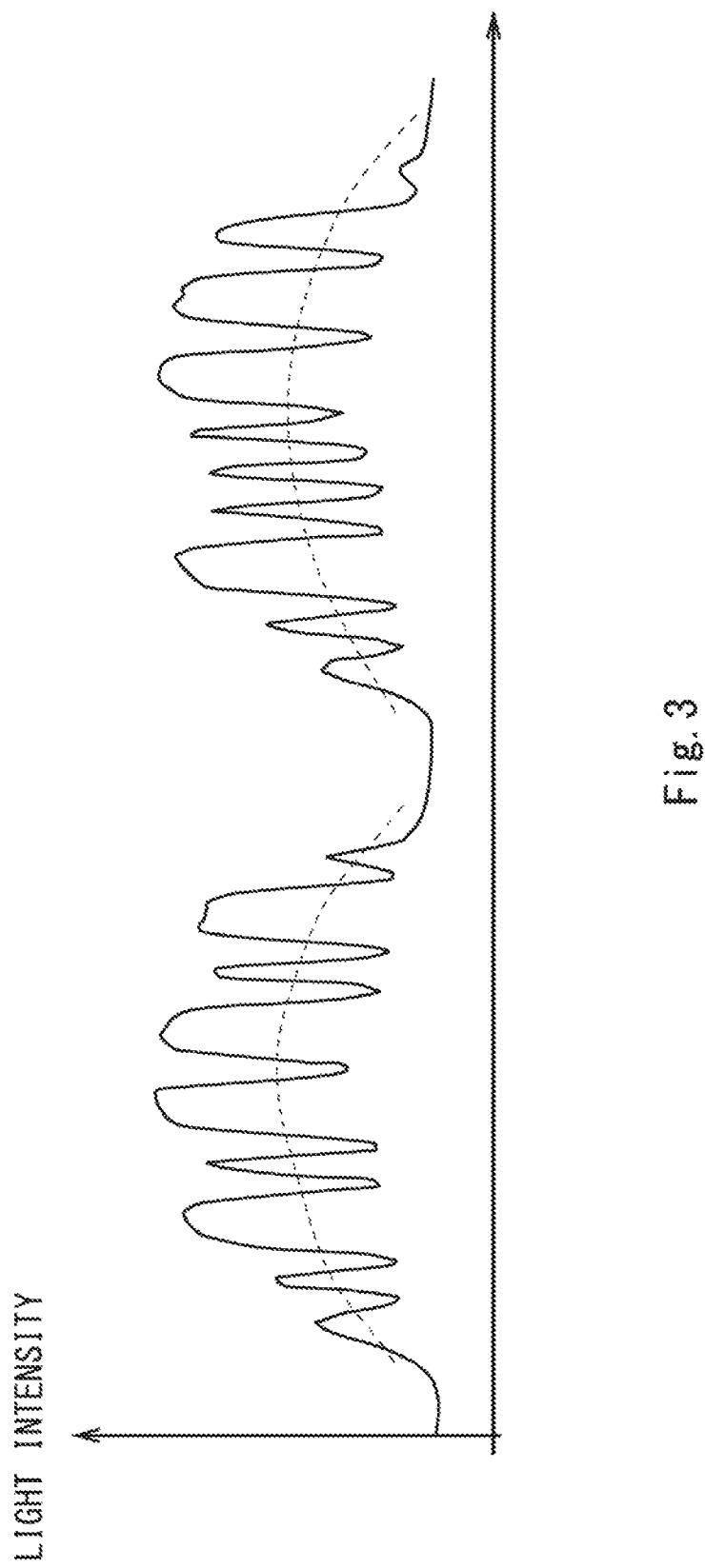
FIG. 3 is a diagram showing an example of a bright/dark image having distortion.
Figure 4:
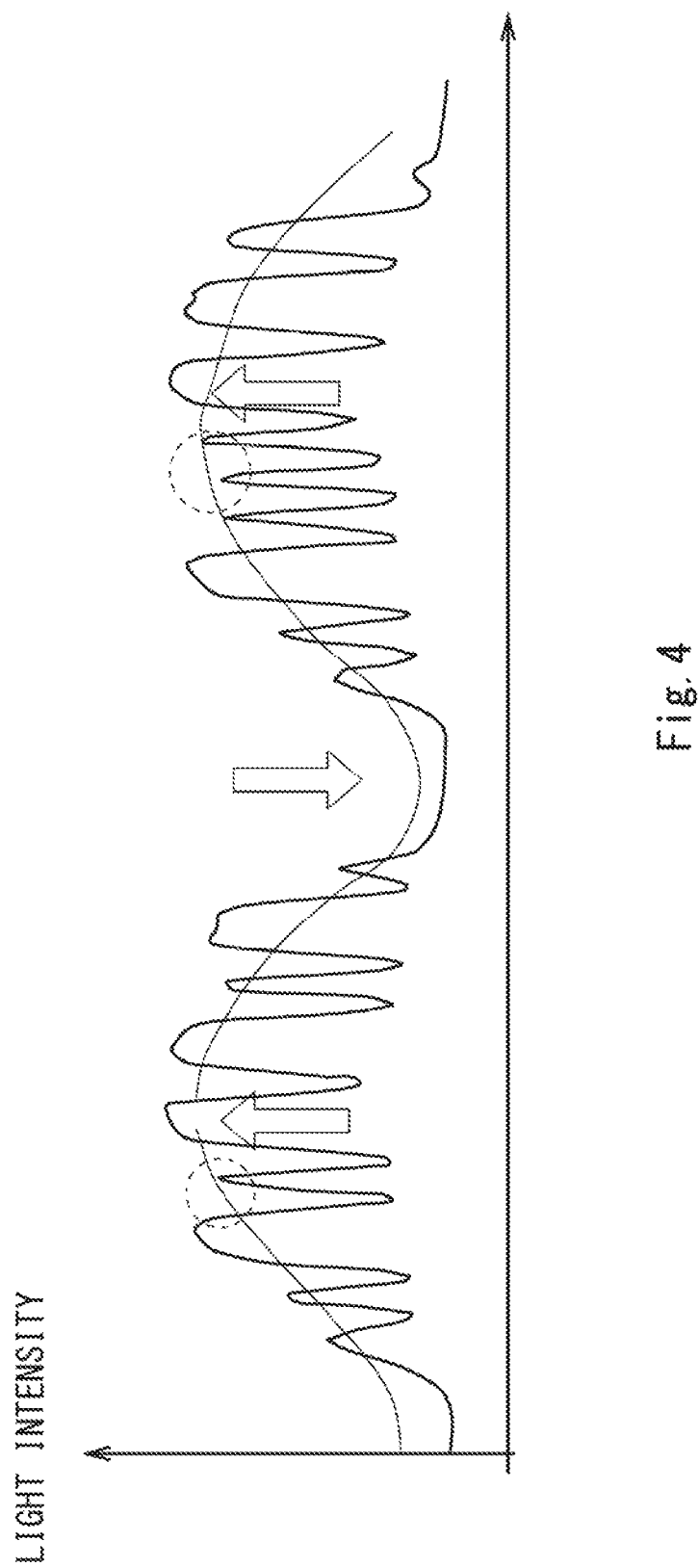
FIG. 4 is a diagram showing, as an example, that a threshold line formed of long-period components is obtained from the bright/dark image having distortion with the Fourier transform.

Embodiments of the present invention are illustrated and described with reference to reference signs assigned to elements in the drawings.

First Exemplary Embodiment

A first exemplary embodiment of the present invention relates to a signal processing method, for a photoelectric encoder, capable of correctly determining a bright pan and a dark part in a bright/dark pattern having distorted light intensity distribution.

A feature point of the first exemplary embodiment of the present invention is to "set an appropriate threshold". Before the feature point is described, an example of a scale pattern 210 is described.

Figure 5:
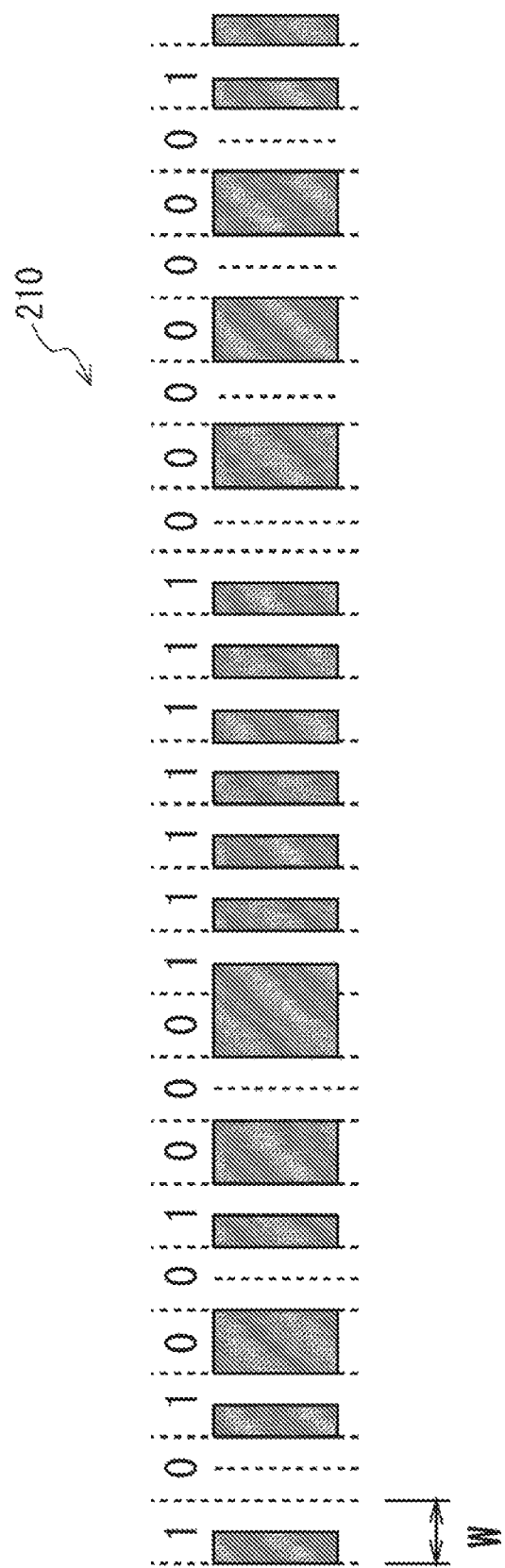
FIG. 5 is a diagram showing an example of a scale pattern.

FIG. 5 is a scale pattern of a transmission-type photoelectric absolute encoder using a pseudo random code. To correctly acquire the absolute position from this scale pattern, it is necessary to correctly and accurately detect brightness (H) and darkness (L) of bits as many as possible.

(Description of Scale Pattern)

The scale pattern 210 shown in FIG. 5 is an absolute (ABS) scale pattern using an M-sequence code, which is one of pseudo random code sequences. When continuous N codes in an M-sequence code pattern are taken out, the pattern of the N codes appears once in a cycle of the M-sequence code pattern. In the example of FIG. 5, in an ABS scale pattern in which codes "1" and "0" are randomly arranged, the codes "1" and "0" are each represented with two bits. The code "1" is represented by a combination of a non-transmitting part and a transmitting part. On the other hand, the code "0" is represented by a combination of both transmitting parts or of both non-transmitting parts.

Here, for the sake of the following description, a transmitting pan is referred to as a "bright part" (or "H"), and a non-transmitting part is referred to as a "dark part" (or "L").

Figure 6:
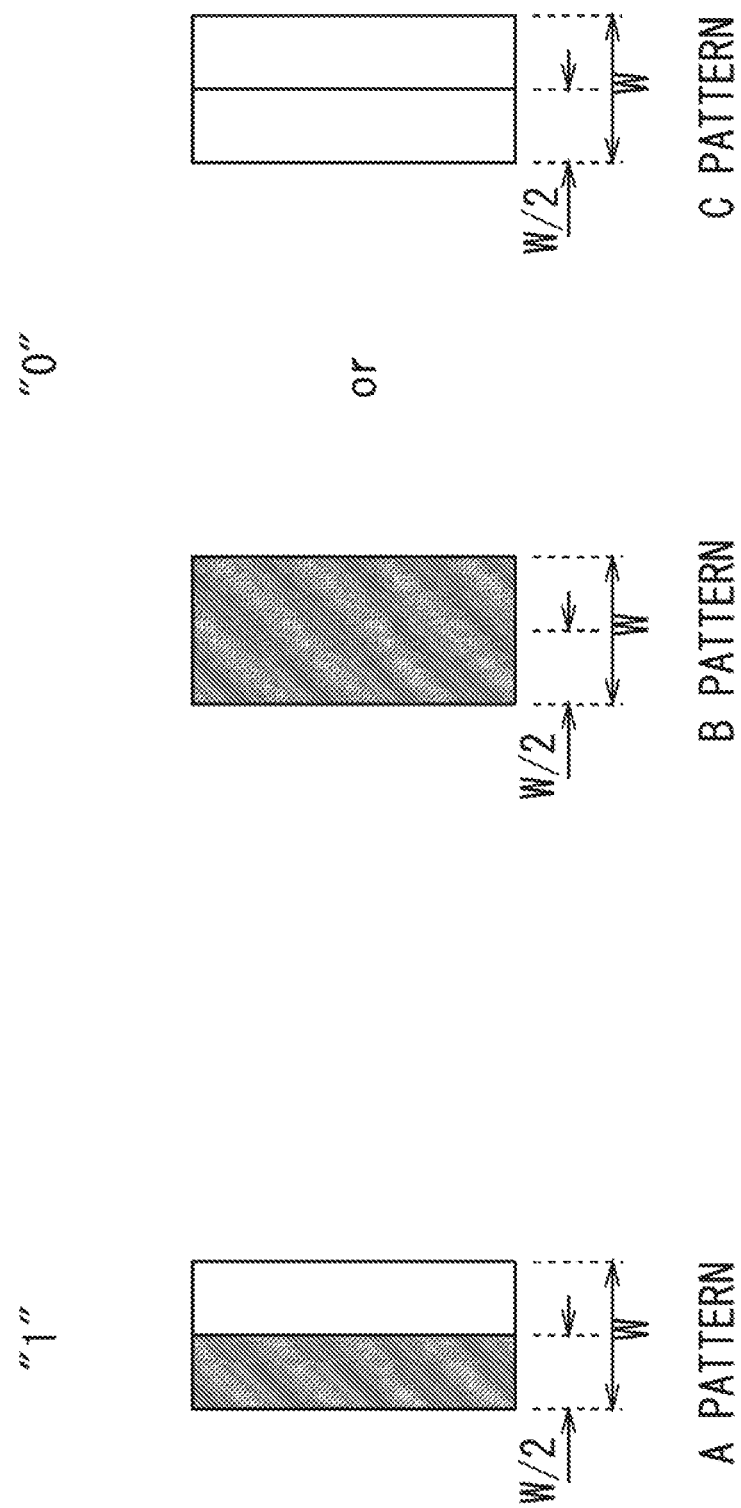
FIG. 6 is a diagram showing examples of combinations of bits representing a code 1 and a code 0.

In the scale pattern 210, two patterns (both bits are transmitting parts or both bits are non-transmitting parts) are used to represent the code "0" (FIG. 6). Here, the pattern in which both bits are non-transmitting parts is referred to as a B pattern, and the pattern in which both bits are transmitting parts is referred to as a C pattern. In order to represent the code "0", the B pattern and the C pattern are to be used alternately. That is, when the codes "0" continue, the B pattern and the C pattern are to be arranged alternately. If this arrangement rule (design rule) is applied, the number of continuous bright parts (H) or continuous dark parts (L) is three at most.

Naturally, the B pattern and the C pattern are not necessarily arranged alternately, and the maximum number of continuous B patterns or continuous C patterns is only required to be predetermined. Then, the maximum number of continuous bright parts (H) and the maximum number of continuous dark parts (L) are automatically determined.

Note that, the present invention is not limited to an ABS scale pattern using a pseudo random code sequence (for example, an M-sequence code), and is also applicable to, for example, reading of an increment-type scale pattern.

(Description of Operation)

Figure 7:
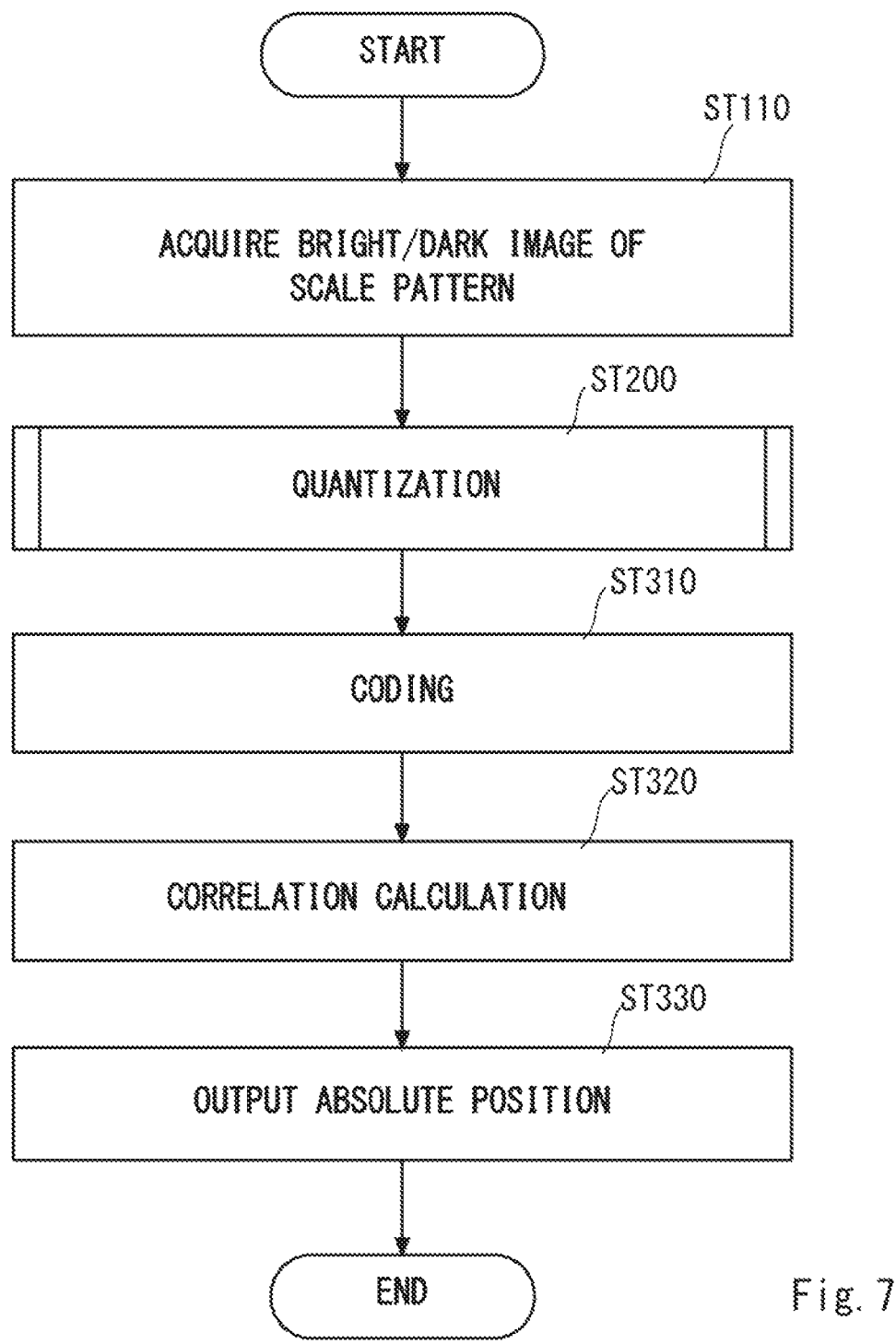
FIG. 7 is a flowchart of a procedure for calculating an absolute position from an acquired bright/dark pattern.

FIG. 7 shows a flowchart of a procedure for calculating the absolute position from a bright/dark pattern (bright/dark image) acquired by the light-receiving detector 300.

This calculation operation is performed by the signal processing unit 400.

First, the signal processing unit 400 sequentially sweeps a signal from a photodetector array of the light-receiving detector 300 to acquire the transmitted light pattern of the ABS scale 200 as a bright/dark image (ST110). Then, the acquired bright/dark image is sequentially quantized (ST200). That is, threshold determination is performed to the light intensity of the acquired bright/dark image to distinguish and binarize a dark part and a bright part.

The threshold setting at this time is to be described later.

The dark part is referred to as "L" and the bright part is referred to as "H".

Next, coding is performed (ST310).

One code is represented with two bits.

The combination of (L, H) is converted into the code "1".

The combination of (L, L) or (H, H) is converted into the code "0".

Figure 8:
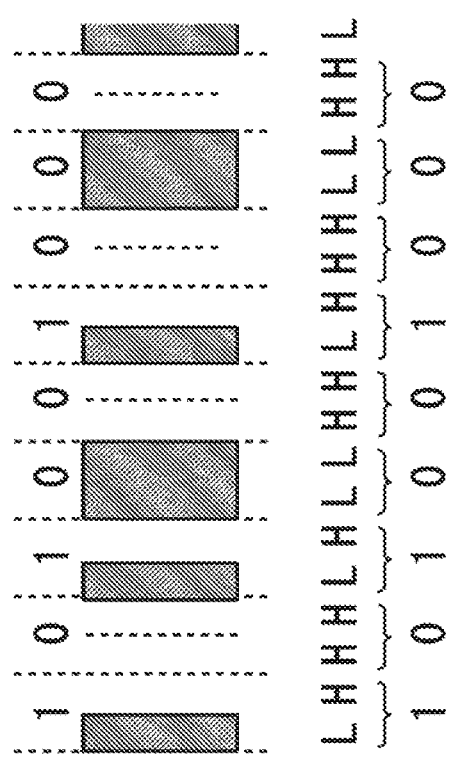
FIG. 8 is a diagram showing an example of a result of coding.

FIG. 8 shows an example of a result of coding.

With the data coded in this manner, correlation calculation with a reference pattern is performed (ST320). The position indicating the highest correlation as the result of the correlation calculation is obtained as the current absolute position (ST330). Note that, as the reference pattern, a scale pattern provided based on the design rule is used, for example.

(Quantization Process ST200)

Figure 9:
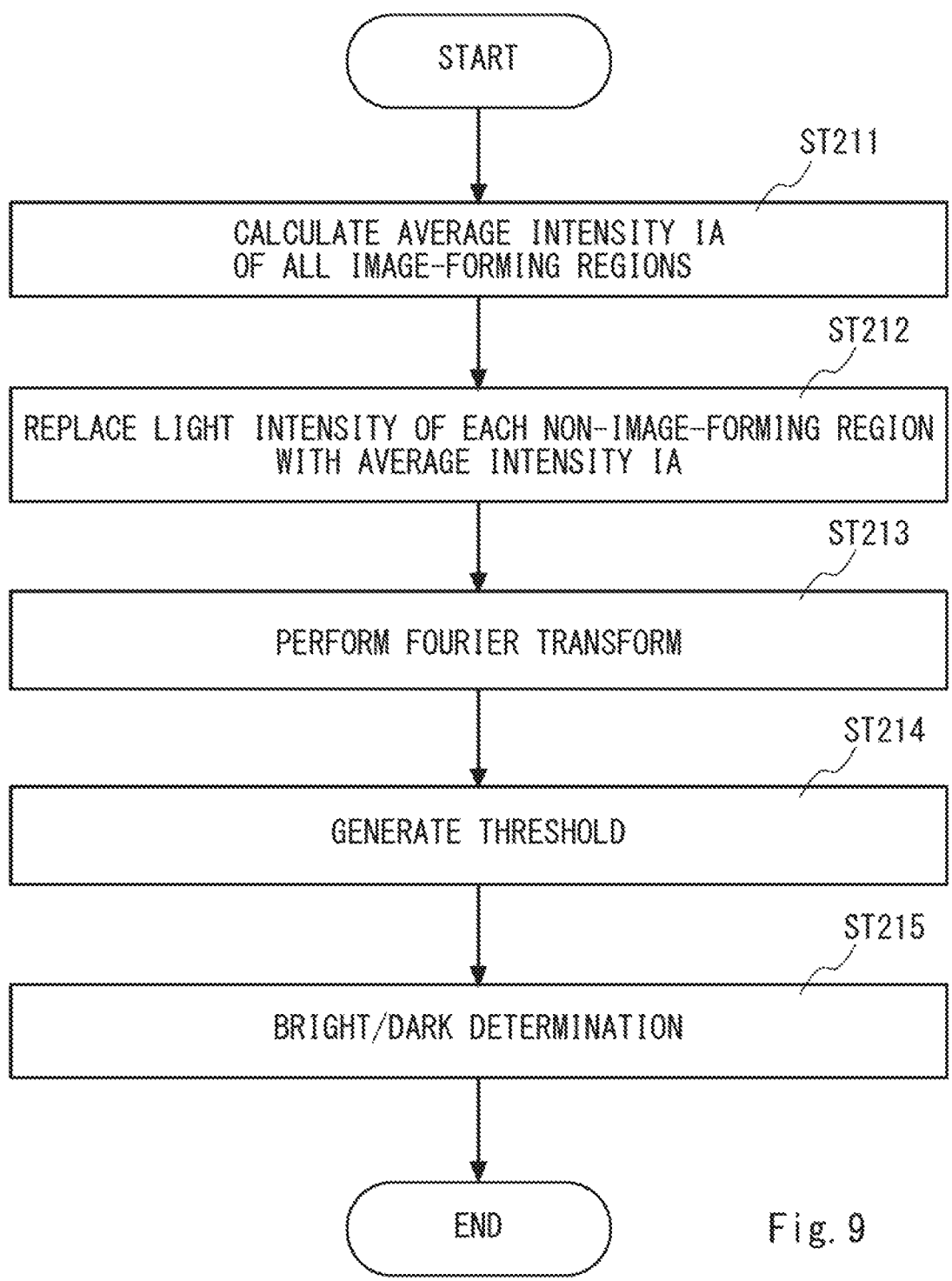
FIG. 9 is a flowchart showing an entire quantization process.

FIG. 9 shows a flowchart of a quantization process ST200.

To perform the quantization process ST200, first, a bright/dark image is classified into image-forming regions and non-image-forming regions, and the mean IA of the light intensities of all the image-forming region is calculated (ST211).

Figure 10:
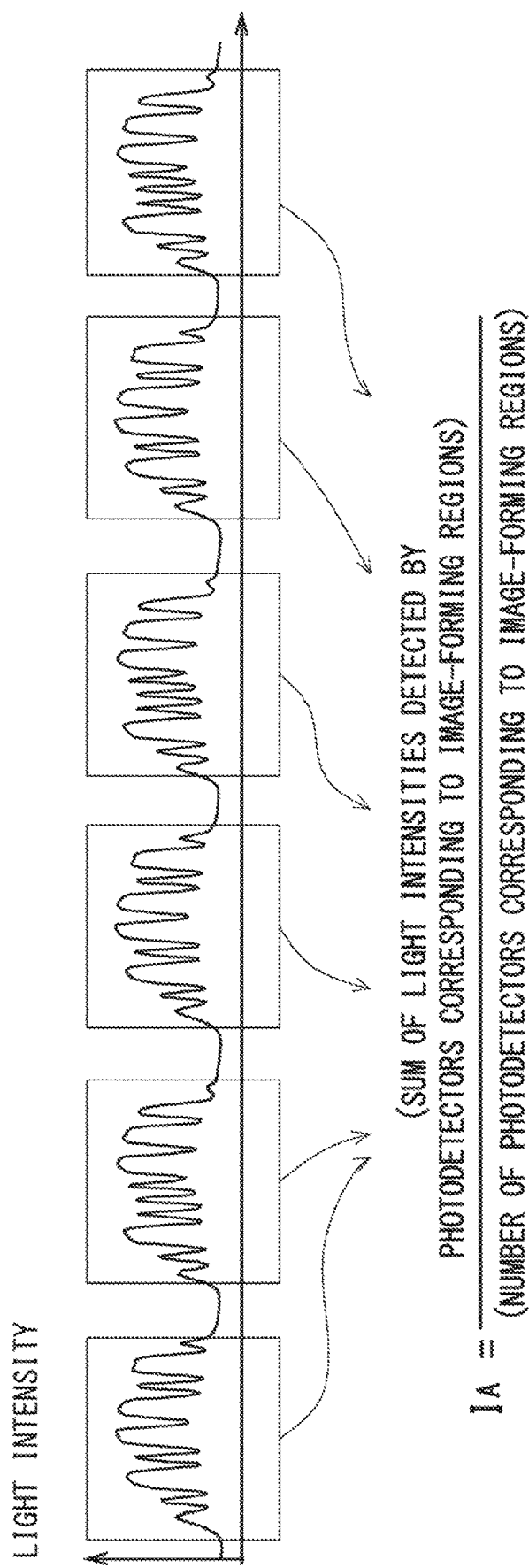
FIG. 10 is a diagram showing, as an example, that all image-forming regions are extracted from a bright/dark image and the mean IA of the light intensities of the image-forming regions is calculated.

Here, it is assumed that the light intensity distribution of the bright/dark image acquired by the light-receiving detector 300 is as shown in FIG. 10.

As described above, a bright/dark image has a pattern in which a non-image-forming region and an image-forming region are alternately repeated at a predetermined pitch. The region between lenses of the lens array 115 is a non-image-forming region, and the region corresponding to a lens is an image-forming region. These are already known at the lime of designing the detection head, and the positions of non-image-forming regions and image-forming regions in the bright/dark image are known in advance.

Thus, as schematically shown in FIG. 10, all image-forming regions are extracted from the bright/dark image, and the mean IA of the light intensities of all the image-forming regions is calculated (ST211). The "mean IA of the light intensities of the image-forming regions" is referred to as an average intensity IA.

Figure 11:
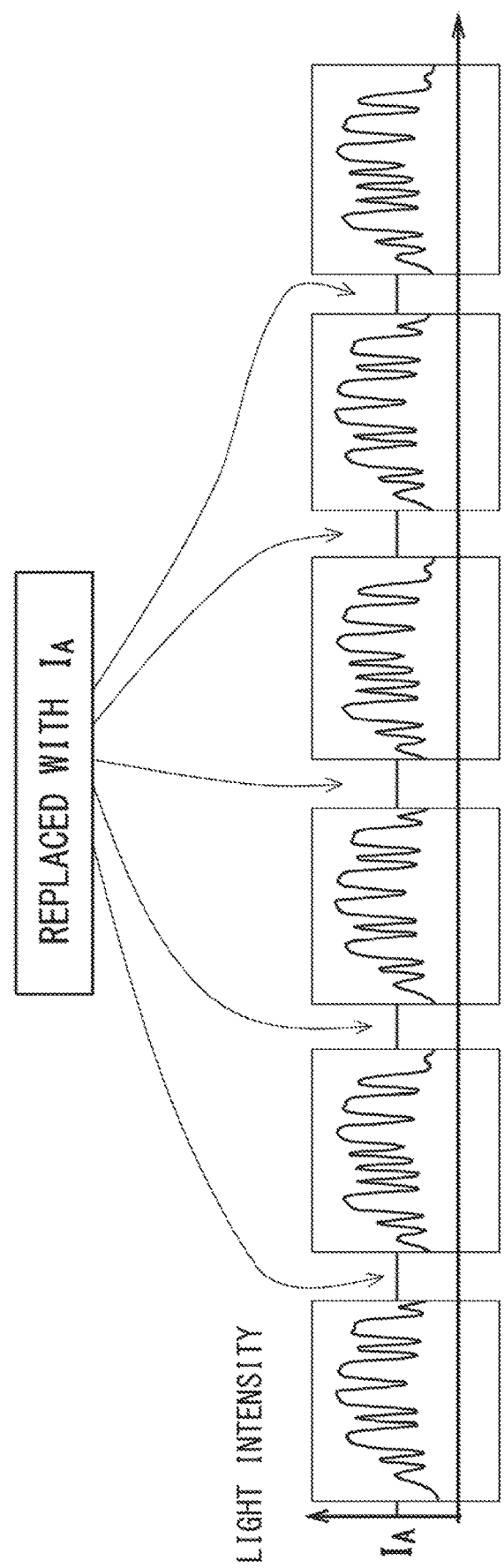
FIG. 11 is a diagram showing an example of a pre-processed bright/dark image.

Next, the light intensity of each non-image-forming region in the bright/dark image is replaced with the calculated average intensity IA (ST212, see FIG. 11). The bright/dark image after the light intensity of each non-image-forming region is replaced with the average intensity IA is referred to as a pre-processed bright/dark image. FIG. 11 is a diagram showing an example of a pre-processed bright/dark image.

Then, the Fourier transform is performed to the pre-processed bright/dark image (ST215), a threshold is generated from long-period components lower than a predetermined frequency (ST214).

Figure 12:
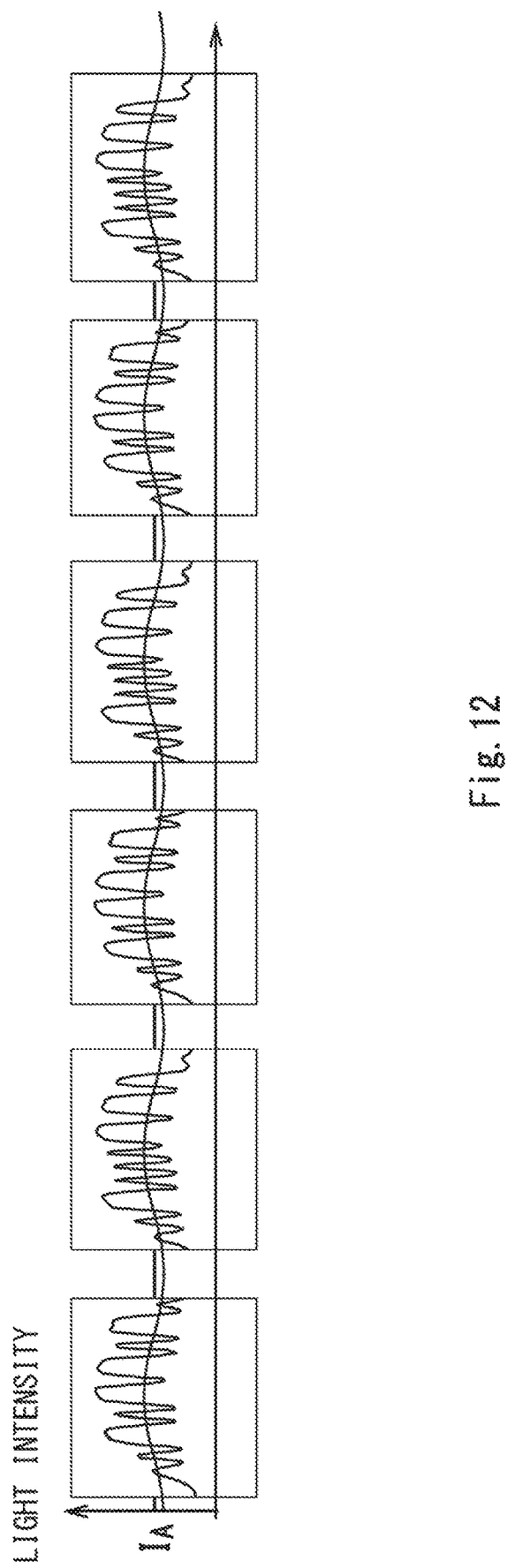
FIG. 12 is a diagram showing an example of a threshold line calculated from the pre-processed bright/dark image with the Fourier transform.

FIG. 12 is a diagram showing an example of a threshold line calculated from the pre-processed bright/dark image with the Fourier transform. Then, bright/dark determination is performed using the threshold (ST215). (That is, the threshold is applied to the original bright/dark image to perform bright/dark determination.)

According to the present exemplary embodiment, a dark part of a non-image-forming region does not affect generation of a threshold, and it is possible to obtain an ideal threshold for the bright/dark determination. Accordingly, it is possible to correctly and accurately obtain the absolute position based on bit information obtained with the correct bright/dark determination.

Second Exemplary Embodiment

Next, a second exemplary embodiment of the present invention is described.

The second exemplary embodiment is basically similar to the first exemplary embodiment, but the light intensity of a non-image-forming region is replaced with the average intensity of the adjacent image-forming regions in the second exemplary embodiment.

Figure 13:
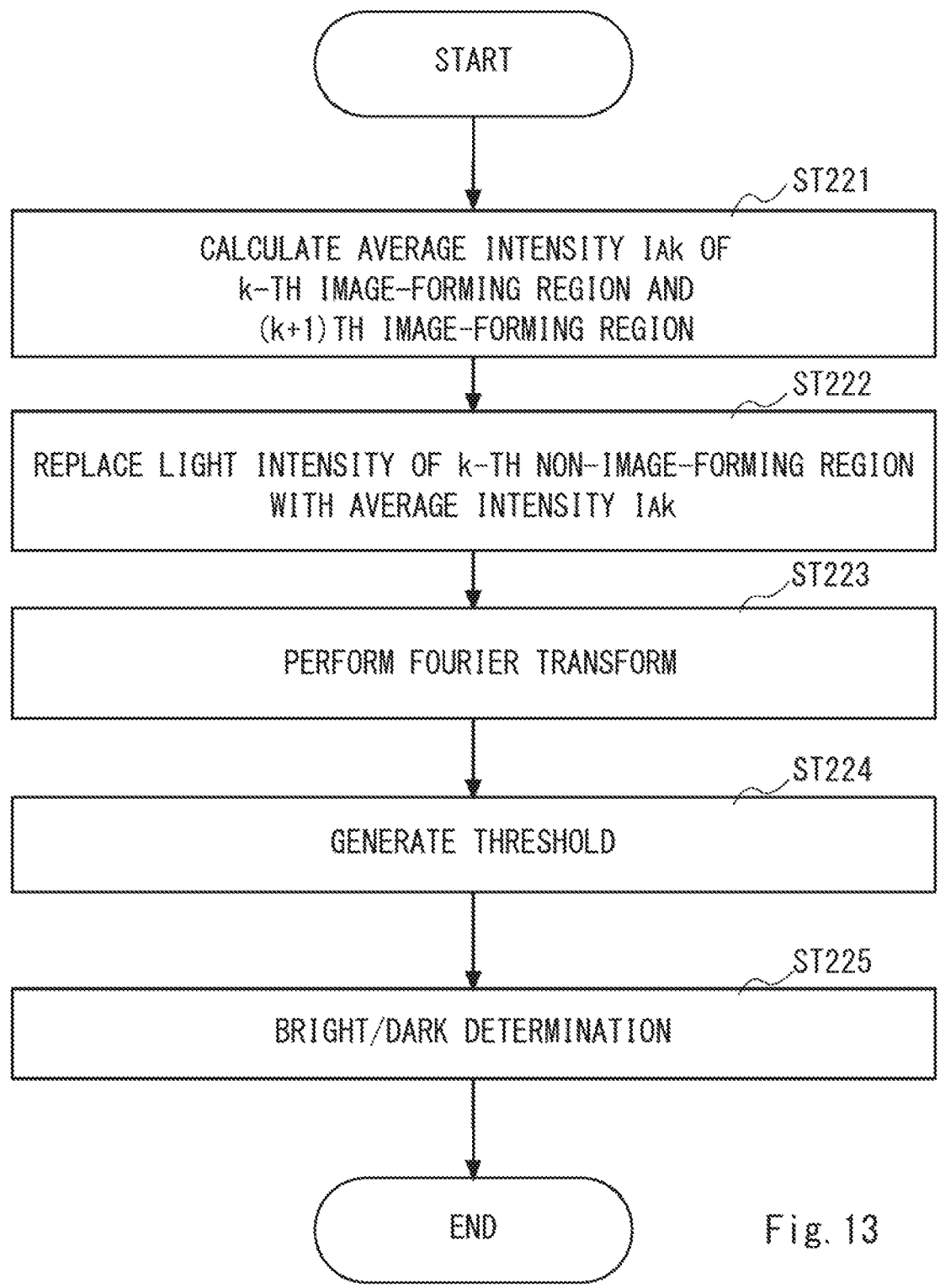
FIG. 13 is a flowchart showing a procedure of a quantization process in a second exemplary embodiment.

FIG. 13 is a flowchart showing a procedure of a quantization process in the second exemplary embodiment.

In the second exemplary embodiment, first, a bright/dark image is classified into image-forming regions and non-image-forming regions, and the image-forming regions and the non-image-forming regions is distinguished one by one by numbering them from the left.

Figure 14:
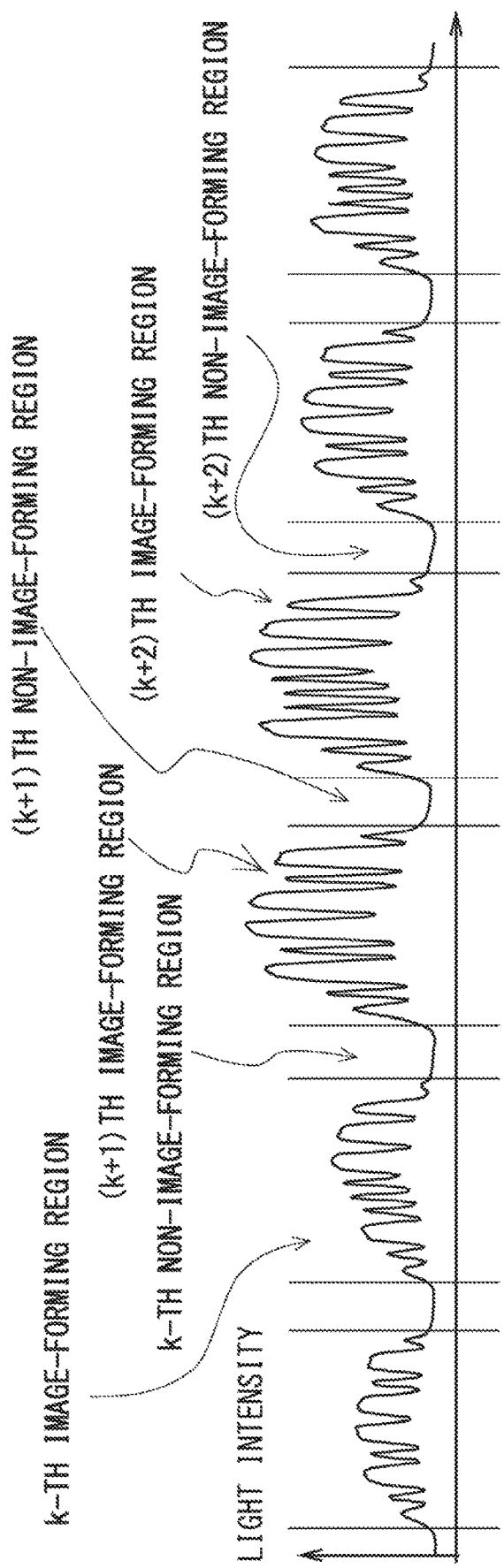
FIG. 14 is a diagram schematically explaining that a bright/dark image is classified into image-forming regions and non-image-forming regions, and that the image-forming regions and the non-image-forming regions are distinguished one by one by numbering them from the left.

An example of this is shown in FIG. 14.

The image-forming regions are sequentially distinguished as a 0th image-forming region, a first image-forming region, a second image-forming region, a third image-forming region, and so on from the left. Similarly, the non-image-forming regions are sequentially distinguished as a 0th non-image-forming region, a first non-image-forming region, a second non-image-forming region, a third non-image-forming region, and so on from the left.

Figure 15:
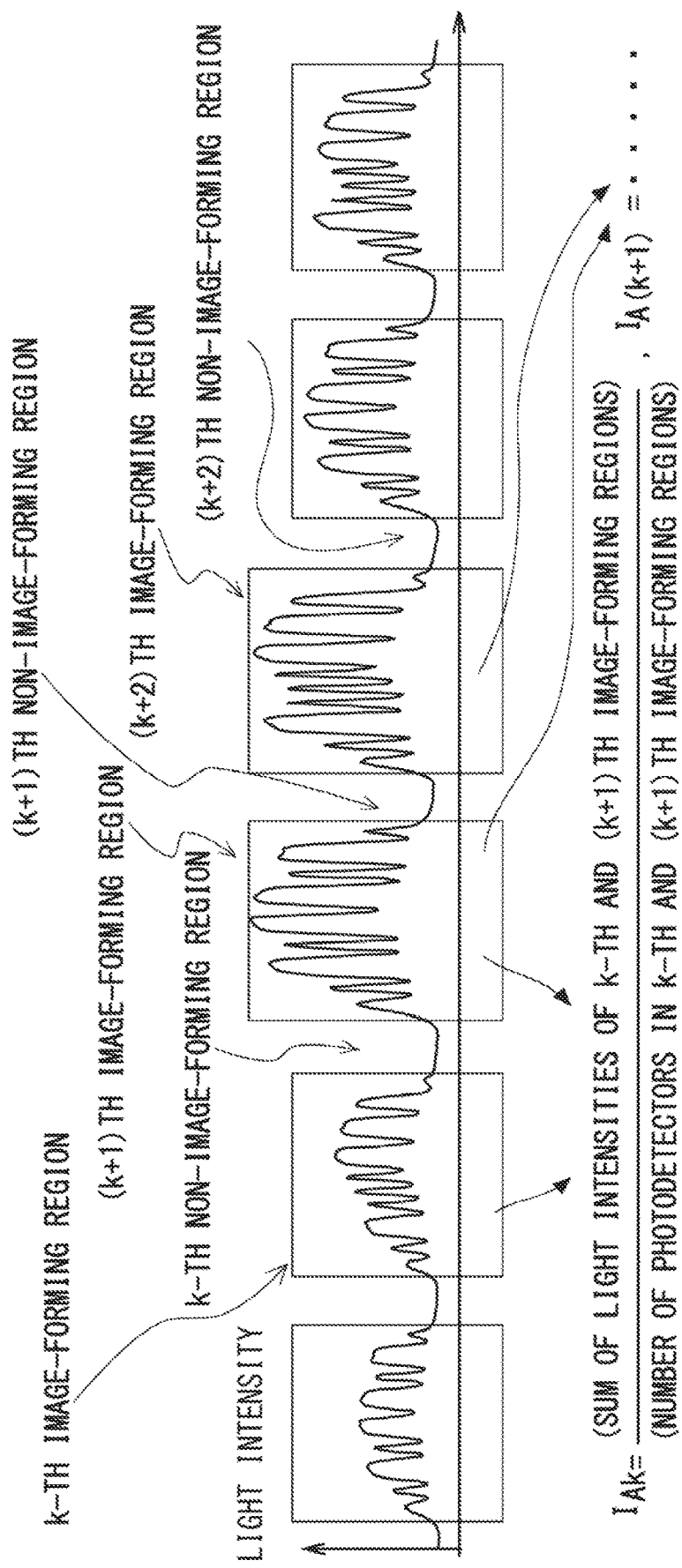
FIG. 15 is a diagram showing that the average intensity IAk is calculated based on the light intensities of the image-forming regions adjacent to a non-image-forming region.

Then, the mean of the light intensities of the adjacent image-forming regions is calculated (ST221). For example, the average intensity IAk of the k-th image-forming region and the (k+1)th image-forming region that are positioned on both sides of the k-th non-image-forming region is calculated (see FIG. 15). Note that, k is zero or a natural number.

Figure 16:
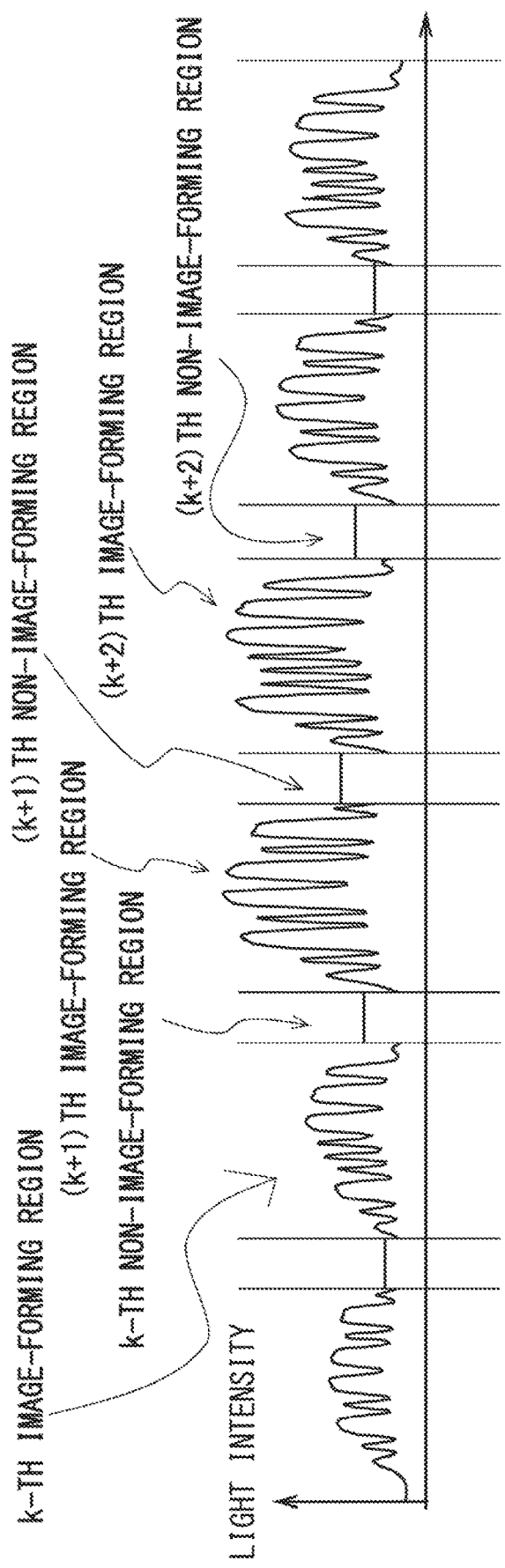
FIG. 16 is a diagram showing an example of a pre-processed bright/dark image.

Then, the light intensity of the k-th non-image-forming region which is the non-image-forming region between the k-th image-forming region and the (k+1)th image-forming region is replaced with the calculated average intensity IAk (see ST222 in FIG. 16). In this manner, a pre-processed bright/dark image as exemplified in FIG. 16 is obtained.

Figure 17:
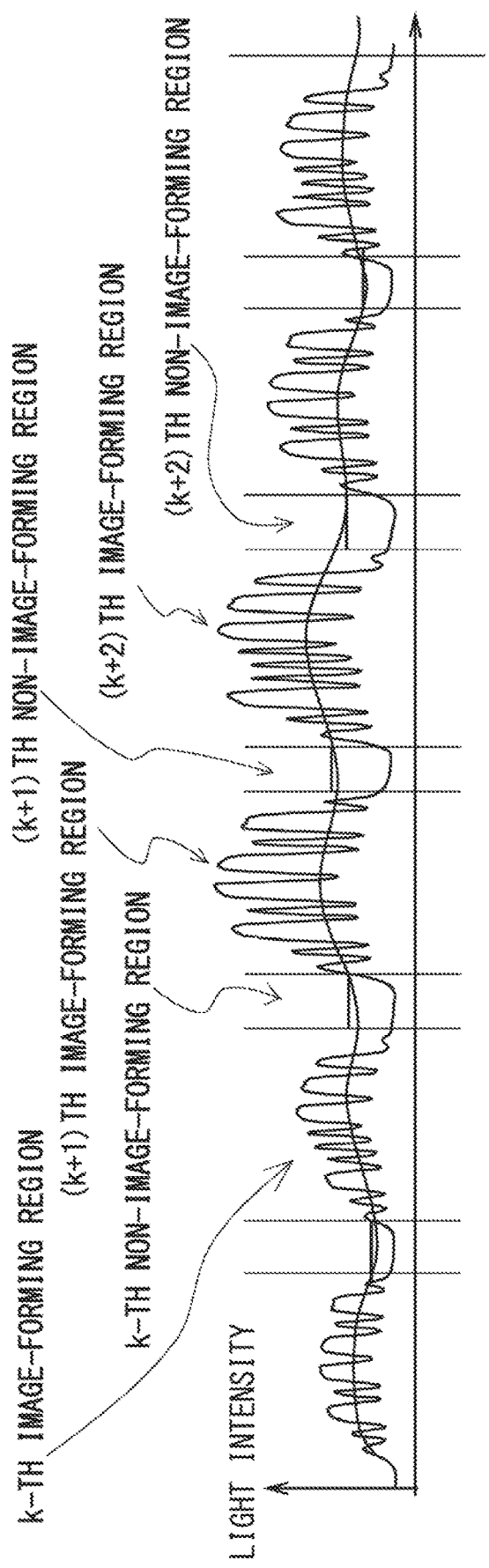
FIG. 17 is a diagram showing an example of a threshold line calculated from the pre-processed bright/dark image with the Fourier transform.

Finally, the Fourier transform is performed to the pre-processed bright/dark image (ST223), and a threshold is generated from the long-period components lower than a predetermined frequency (ST224). FIG. 17 is an example of a threshold line. Then, bright/dark determination is performed using the threshold (ST225).

If the light quantity distribution from the light source is uneven, the peak value or the base value of the light intensity can be different depending on positions despite an image-forming region. In such a situation, if the light intensity of each non-image-forming region is replaced with the average intensity IA, the threshold line at a position can be too high or too low. In this regard, by replacing the light intensity of each non-image-forming region is replaced with the average intensity of its adjacent image-forming regions as in the second exemplary embodiment, it is possible to obtain a threshold line reflecting unevenness of light quantity distribution and to obtain an ideal threshold for bright/dark determination.

Third Exemplary Embodiment

Next, a third exemplary embodiment of the present invention is described.

The third exemplary embodiment is basically similar to the second exemplary embodiment, but an image-forming region is more finely divided to replace the light intensity of each non-image-forming region with the average intensity of its adjacent image-forming regions in the third exemplary embodiment.

Figure 18:
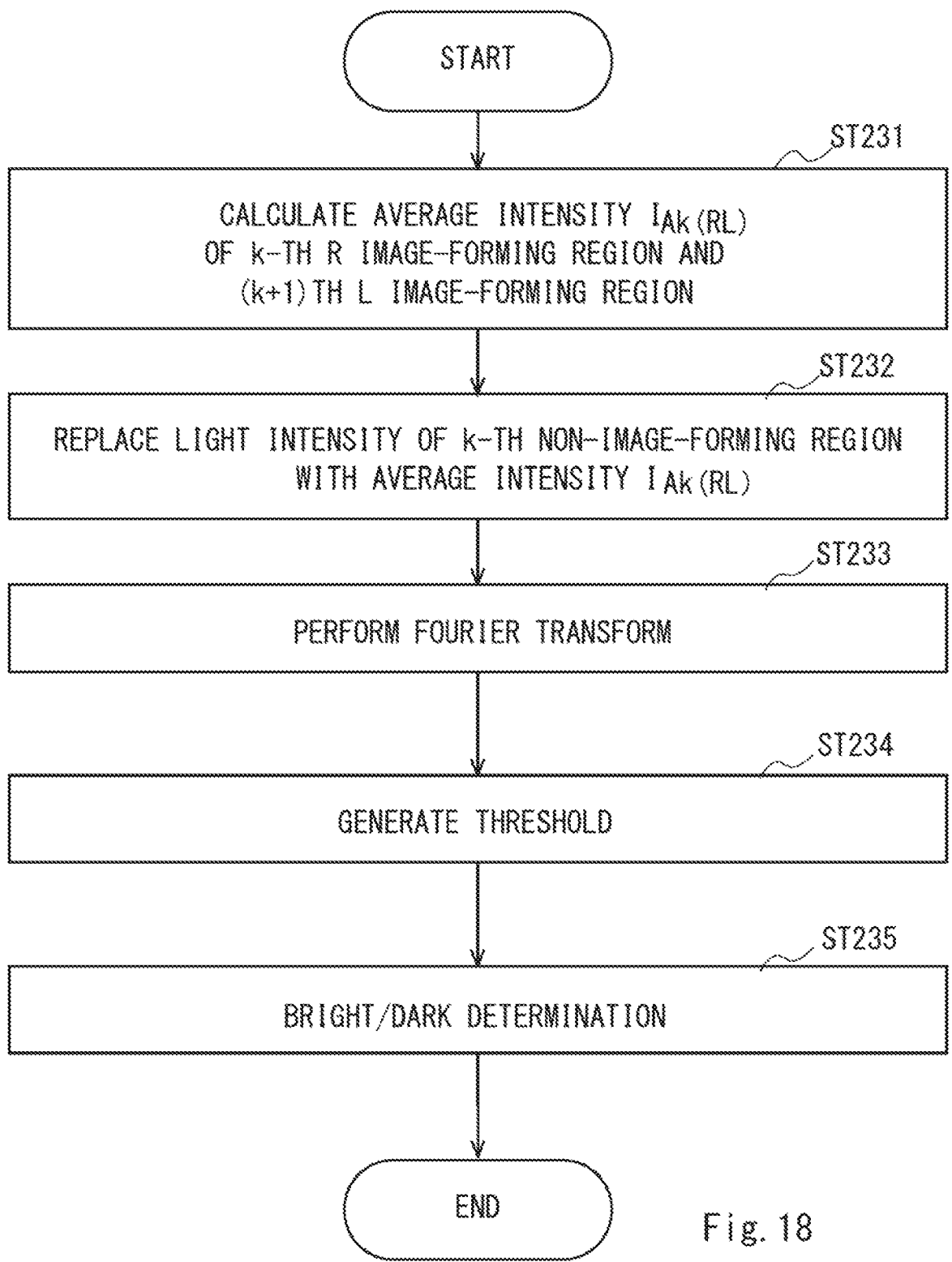
FIG. 18 is a flowchart showing a procedure of a quantization process in a third exemplary embodiment.

FIG. 18 is a flowchart showing a procedure of a quantization process in the third exemplary embodiment.

In the third exemplary embodiment, a bright/dark image is classified into image-forming regions and non-image-forming regions, and the image-forming regions and the non-image-forming regions are distinguished one by one by numbering them from the left.

At this time, each image-forming region is further divided in half to distinguish the left side as "L" and the right side as "R".

Figure 19:
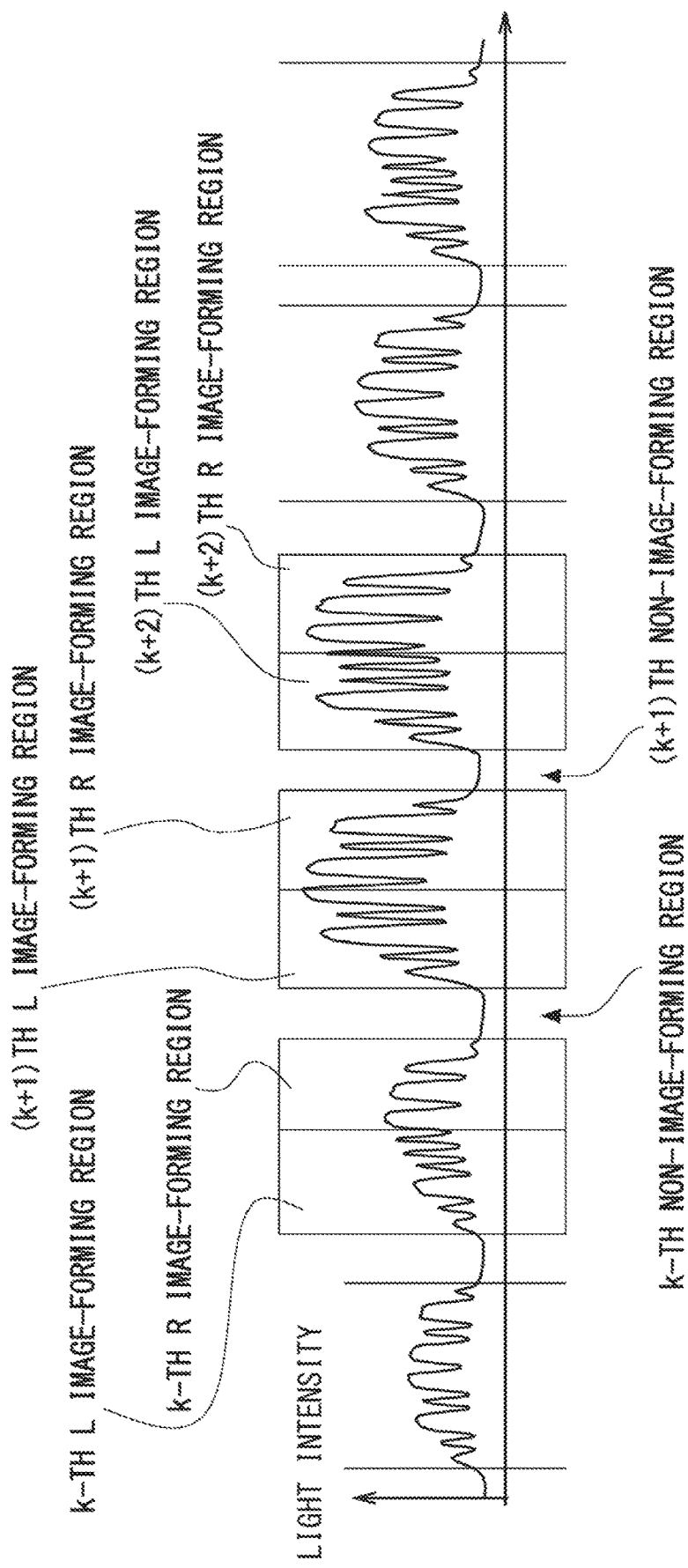
FIG. 19 is a diagram schematically explaining that a bright/dark image is classified into image-forming regions and non-image-forming regions, and that the image-forming regions and the non-image-forming regions are distinguished one by one by numbering them from the left.

An example of this is shown in FIG. 19.

That is, the image-forming regions are distinguished as a 0th L image-forming region, a 0th R image-forming region, a first L image-forming region, a first R image-forming region, a second L image-forming region, a second R image-forming region, and so on from the left.

The non-image-forming regions are distinguished as a 0th non-image-forming region, a first non-image-forming region, a second non-image-forming region, and so on from the left.

Then, the mean of the light intensities of the image-forming regions positioned on both sides of a non-image-forming region (ST231).

Figure 20:
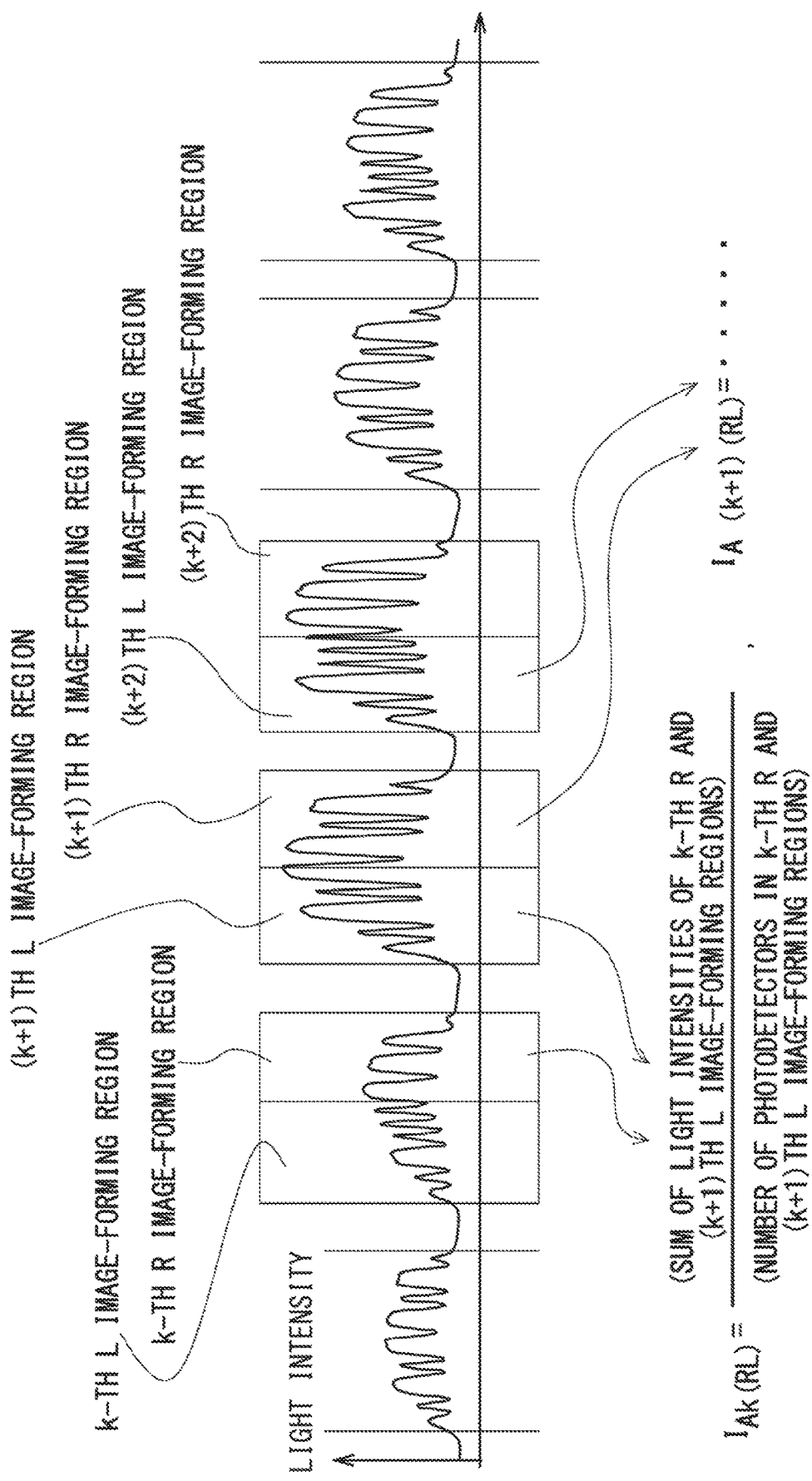
FIG. 20 is a diagram showing, as an example, that the average intensity IAk(RL) is calculated based on the light intensities of the image-forming regions adjacent to a non-image-forming region.

For example, the average intensity IAk(RL) of the k-th R image-forming region and the (k+1)th L image-forming region that are positioned on both sides of the k-th non-image-forming region is calculated (see FIG. 20).

Note that, k is zero or a natural number.

Then, the light intensity of the k-th non-image-forming region, which is the non-image-forming region between the k-th R image-forming region and the (k+1)th L image-forming region, is replaced with the calculated average intensity IAk(RL) (ST232).

In this manner, a pre-processed bright/dark image is obtained.

Finally, the Fourier transform is performed to the pre-processed bright/dark image (ST233), and a threshold is generated from long-period components lower than a predetermined frequency (ST234). Then, bright/dark determination is performed with the threshold (ST235).

By replacing the light intensity of each non-image-forming region with the average intensity of its adjacent image-forming regions, it is possible to obtain a threshold line reflecting unevenness of light quantity distribution, and to obtain an ideal threshold for bright/dark determination. At this time, by more finely dividing an image-forming region as in the third exemplary embodiment, it is possible to obtain a threshold line more appropriately reflecting unevenness of light quantity distribution.

Modified Example 1

In the second and third exemplary embodiments, the light intensity of the k-th non-image-forming region has been replaced with a value reflecting the light intensities of the image-forming regions adjacent to the k-th non-image-forming region (the average intensity IAk or IAk (RL)).

As a modified example, the average intensity may be obtained from the regions from the image-forming regions adjacent to the k-th non-image-forming region to two or three image-forming regions away from the k-th non-image-forming region. If a main scale has dirt on it, a part or all of one image-forming region can be a dark part (or a bright pan). By including a plurality of image-forming regions near the k-th non-image-forming region to calculate the average intensity, it is possible to reduce the influence of an abnormal value of an image-forming region indicating, for example, peculiar darkness or brightness.

Modified Example 2

In the above embodiments, an image-forming region from a non-image-forming region has been distinguished based on the design value of a lens array. However, a bright/dark image may be analyzed to determine an image-forming region and a non-image-forming region. For example, if there is a predetermined number of (for example, ten or a hundred) continuous dark parts, such continuous dark parts may be determined as the non-image-forming region between lenses based on the scale pattern design.

Figure 21:
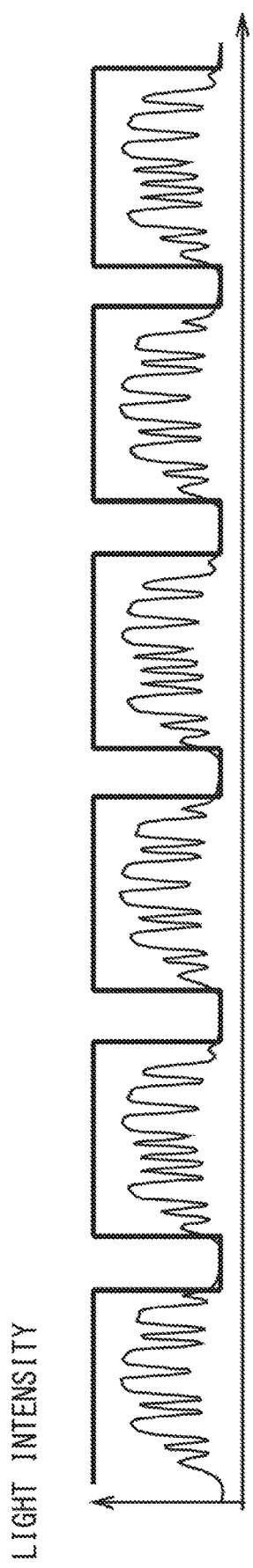
FIG. 21 is a diagram showing a bright/dark image simply approximated by a square wave.

Alternatively, to distinguish an image-forming region from a non-image-forming region, the Fourier transform may be used. Since an image-forming region and a non-image-forming region are necessarily repeated at a predetermined pitch in a pattern, a bright/dark image is simply regarded as a square wave as exemplified in FIG. 21. When the Fourier transform is performed to the bright/dark image and low-frequency components (for example, from the primary to tertiary components) are extracted, a square wave as shown in FIG. 21 is obtained. Then, by performing bright/dark determination to the square wave using the light intensity of about 0.5 (that is, the average intensity of the entire light intensities) as the threshold, it is possible to classify the bright/dark image into image-forming regions and non-image-forming regions.

Note that, the present invention is not limited to the above embodiments, and can be changed appropriately without departing from the scope.

In the above embodiments, a region between lenses of the micro lens array has been a non-image-forming region, as an example. However, in the case of a single lens as well as a lens array, a non-image-forming region appears as exemplified in FIG. 22. That is, the light-receiving detector 300 detects the region corresponding to the center region of the lens as an image-forming region, and the region corresponding to the periphery part of the lens as a non-image-forming region.

In this case, since $2^n$ pieces of data is needed to perform the Fourier transform at high speed, a bright/dark image including not only the image-forming region but also the non-image-forming regions near the image-forming region is required. Then, a pre-process for replacing the light intensity of each non-image-forming region in the present invention is effective.

The point of the present invention is to replace the light intensity of each non-image-forming region with a value reflecting the light intensities of image-forming regions (representative value).

In the above exemplary embodiments, the average intensity IA has been exemplified as the value reflecting the light intensities of image-forming regions, but the value reflecting the light intensities of image-forming regions is not limited to a "mean".

For example, the value may be an intermediate value (median).

In the above embodiments, the ABS scale has been a transmission-type scale, but may be a reflection-type scale. In the above embodiments, the linear scale and encoder has been exemplified, but the present invention is also applicable to a rotary encoder.

The invention claimed is:

1. A signal processing method for a photoelectric encoder, the photoelectric encoder comprising:
   a scale provided with a two-level code pattern along a length measurement direction; and
   a detector unit provided to be relatively movable along the scale and configured to detect, based on the two-level code pattern on the scale, a relative position with respect to the scale, and
   the detector unit comprising:
   a light source;
   a light-receiving detector configured to receive reflected light or transmitted light from the scale and to acquire a first bright/dark image; and
   a lens arranged between the light source and the light-receiving detector,
   the method comprising:
   classifying, by the detector unit, the first bright/dark image acquired by the light-receiving detector into an image-forming region corresponding to a center region of the lens and a non-image-forming region corresponding to all regions except for the center region of the lens;
   calculating, by the detector unit, a representative value reflecting a light intensity of the image-forming region; and
   obtaining a second bright/dark image in which a light intensity of the non-image-forming region in the first bright/dark image is replaced with the representative value.

2. The signal processing method for the photoelectric encoder according to claim 1, further comprising:
   performing a Fourier transform to the second bright/dark image to obtain a third bright/dark image;
   obtaining a threshold line formed of long-period components in the third bright/dark image, the long-period components having a frequency lower than a predetermined frequency; and
   performing, based on the first bright/dark image and the threshold line, bright/dark determination of the first bright/dark image.

3. The signal processing method for the photoelectric encoder according to claim 1, wherein
   the lens is a micro lens array, and
   the method further comprises:
   after the classifying the first bright/dark image into the image-forming region and the non-image-forming region;
   distinguishing the image-forming region as a 0th image-forming region, a first image-forming region, a second image-forming region, and so on;
   distinguishing the non-image-forming region as a 0th non-image-forming region, a first non-image-forming region, a second non-image-forming region, and so on;
   calculating the representative value Ik from a k-th image-forming region and a (k+1)th image-forming region that are positioned on both sides of a k-th non-image-forming region; and
   replacing a light intensity of the k-th non-image-forming region with the representative value Ik,
   where, k is zero or a natural number.

4. The signal processing method for the photoelectric encoder according to claim 3, further comprising:
   dividing in half and classifying the k-th image-forming region into a k-th L image-forming region and a k-th R image-forming region;
   calculating the representative value Ik(RL) from the k-th R image-forming region and a (k+1)th L image-forming region that are positioned on both sides of the k-th non-image-forming region; and
   replacing the light intensity of the k-th non-image-forming region with the representative value Ik(RL).

5. The signal processing method for the photoelectric encoder according to claim 1, wherein the representative value is a mean or a median.

* * * * *